Figure 1:
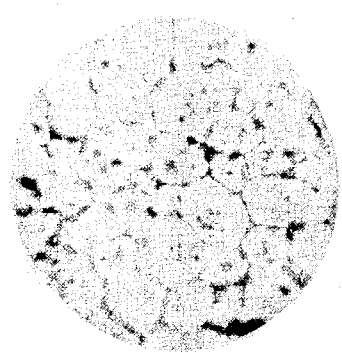

Oct. 23, 1951     L. W. AUSTIN     2,572,688

MAGNESIA REFRACTORY AND METHOD OF MAKING

Filed April 30, 1947

Leslie W. Austin
INVENTOR.

BY James E. Toomey
Agt.

Patented Oct. 23, 1951

2,572,688

UNITED STATES PATENT OFFICE 2,572,688

MAGNESIA REFRACTORY AND METHOD OF MAKING

Leslie W. Austin, San Jose, Calif., assignor to Kaiser Aluminum & Chemical Corporation, a corporation of Delaware Application April 30, 1947, Serial No. 744,893

15 Claims. (Cl. 106—58)

This invention relates to refractory compositions, and particularly to refractory compositions comprising magnesia as the principal ingredient.

It is among the principal objects of this invention to make refractory shaped pieces, such as brick, nodules and the like, which contain high percentages, for instance at least 95% by weight, of magnesium oxide on the ignited basis, such shaped pieces exhibiting satisfactory load-bearing characteristics, with excellent resistance to chemical attack, and very little tendency to thermal spalling. It is a further object to make refractory shaped pieces as described which will carry substantial loading without failure or excessive deformation to temperatures as high as 4000° F.

It has been the experience of the prior art that to burn magnesia to a dense, well-shrunken grain and to make dense and strong refractories from such grains require the addition to the grain material of a considerable proportion of other ingredients, principally silica, which aid in crystallizing the magnesia and in bonding the periclase crystals to each other; or these results require firing the grain in an electric furnace to the fusion point of magnesia or above. Electric fusion, therefore, has been the practice in burning very pure magnesite or other source of magnesia to a dense grain, but it is very expensive. Without resorting to such electric fusion, it has been the experience hitherto that the strength of the grain and the ability to bond the grain into shaped pieces has rapidly decreased as the purity of the grain increased above about 90% MgO. Thus, refractories composed of grains containing around 93% of magnesium oxide have been found to fail at around 2600° F., or even below this temperature, under the standard test load of 25 pounds per square inch, while those containing about 90% of magnesia have shown resistance to deformation under load up to around 3000° F. These differences in behavior are illustrated in Table I below. Because of these unsatisfactory results with increasing purity of the magnesia refractory, the theory has been held that a point, corresponding to about 7% total impurities, was reached beyond which there was insufficient "matrix" material present to tie the magnesium oxide crystals (periclase) together with the necessary strength, and the grain was therefore structurally unsuitable for refractory manufacture. In other words, it has hitherto been believed that, in making refractory shaped pieces, it is necessary to provide sufficient matrix material, or bonding impurities, to allow the periclase grains to re-crystallize and bond themselves together upon firing. In commercial practice, therefore, it has been customary to specify an average of around 93% magnesium oxide content in the purest periclase grain material used, with a maximum content of magnesium oxide not exceeding about 95%. Refractories made from grain materials of these analyses have failed under 25 pounds per square inch loading at 2600° F., or at even lower temperatures.

According to the present invention it has now been found that excellent magnesia refractories are obtained by forming into pieces unfused periclase grains containing at least 95%, and preferably 96% or more, by weight magnesium as oxide, and preferably not more than 2.0% by weight of silicon expressed as silicon dioxide, with the aid of a magnesium compound bonding agent which will provide at least 95%, and preferably 96% or more, by weight of magnesium as oxide and not more than 2% by weight of silicon expressed as $SiO_2$ after firing.

The periclase grain, or aggregate, as stated above, contains at least 95% by weight of magnesium oxide. Such grain can be conveniently prepared from a high-purity source of magnesia by calcination at a temperature of at least 3270° F., but without fusion.

Preferably, the grain is obtained by treating sea-water with dry calcined dolomite powder to precipitate magnesium hydroxide, washing the magnesium hydroxide sludge so obtained with water, and filtering to recover magnesium hydroxide filter cake. The filter cake is then calcined to a medium burn, mixed with water, formed into agglomerates and hardened by hydration, and then the hard, dense agglomerates are calcined, suitably at about 3400° F. to 4000° F. in a stack kiln which can conveniently be continuous in operation. This process is the subject of the co-pending application of Woodward, Serial Number 557,047, filed October 3, 1944. The agglomerates calcines as described, which may be pellets, nodules etc., are crushed to suitable grain size. In still another manner of working, precipitated and refined magnesium hydroxide or carbonate can be directly formed into pellets, briquettes or the like by pressing, and then calcined to periclase at 3270° F., or above, followed by crushing to desired grain size or sizes.

Calcination of the periclase grain material at the temperatures shown above yields a grain having a porosity of less than about 25% and usually of about 20% or less. It has been found that the incorporation of grain material of low silica content and of the composition described above and of this porosity results in a refractory object which, upon firing to temperatures as high as 4000° F., exhibits satisfactorily slight shrinkage.

Alternatively, the grain can be prepared by calcining high-purity magnesite or brucite, suitably at temperatures of around 3600° F. to 4000° F.; or by firing at 3400° F. or above, pelleted and dried precipitated magnesium hydroxide or carbonate.

In forming the refractory objects or pieces, the grain material is crushed and sized and the sizes are employed in proportions favorable to the production of dense bodies upon pressing. This is suitably accomplished by employing relatively larger amounts of coarse and of very fine particles with lesser amounts of intermediate sizes, whereby there is produced a close-fitting structure comprising the coarser particles in close-fitting relationship with the fine particles, and having sufficient of the intermediate sizes to fill the interstices between the larger grains without distending the closely packed structure. In many cases, with tough refractory grains wherein the material inherently crushes to a preponderance of larger sizes it is satisfactory to crush all of the grain material to sizes somewhat smaller than the upper grain size chosen (which may be, for example, material passing a screen having 4 meshes to the linear inch), and then to combine all of this product with a quantity of very finely ground grain material sufficient to impart plasticity or moldability to the batch. In many instances it is suitable to prepare the finely ground material by reducing a portion of the grain material to a size which entirely passes through a screen having 100 meshes to the linear inch and a substantial portion of which passes through 200 mesh or, in other words, averages about 74 microns in diameter. The quantities used will vary somewhat depending upon the size and shape of the individual types of grains. An example of grain size selection is described below.

The bonding materials employed in making the refractory shaped pieces also provide at least 95% of magnesium expressed as magnesium oxide and not more than 2% of silicon expressed as silicon dioxide, in the fired piece. The bonding agent preferably comprises magnesia containing at least 95% of magnesium oxide and an aqueous solution of magnesium chloride. The magnesia used in the bond is finely divided and is chemically active, that is, it forms an oxyacid salt or a Sorel cement, such as magnesium oxychloride or magnesium oxysulfate, for example. Whereas, in the art, an active magnesia has generally been considered to be a light-burn or medium-burn magnesia, which has the property of adsorbing a measurable amount of iodine when agitated with a solution of iodine in carbon tetrachloride, the active magnesia useful in this invention is intended to include more completely ignited, or dead-burned, crystalline magnesia containing at least 95% magnesium oxide. Magnesia of such high purity, retains even in the dead-burn state the ability to react with magnesium chloride or sulfate and to set with solutions of these salts to a Sorel cement. In some cases, therefore, it is desirable to form the refractory objects entirely from crystalline magnesia as described, in order to reduce shrinkage in the fired piece to a minimum. In other cases it is preferred to employ in the bond a low-activity "semi-caustic" magnesia, or even a caustic magnesia, which results in greater plasticity of the mix and more rapid and stronger development of the chemical bond, although somewhat greater shrinkage takes place upon firing, compared to shrinkage when the more highly burned magnesia is employed.

As stated, the solid bond-forming magnesia is finely divided, and preferably it passes entirely through a 200 mesh screen and a substantial proportion of it passes through a 325 mesh screen, corresponding to 44 microns diameter particle size. The fine particle size of the solid bond-forming agent enables good development of the bond upon firing, and also insures satisfactory dispersion and placement of the bond material in the mix as well as satisfactory development of the chemical, or cold, bond, particularly with magnesia of a low order of activity.

The chemical bond, therefore, preferably comprises a Sorel cement formed by the magnesium oxide and magnesium chloride or magnesium sulfate or mixture thereof. The magnesium salts are preferably added in solution in the water used to temper the refractory composition mix. The salts are added suitably in amounts ranging from about 1% to 3% by weight of the dry batch, and, conveniently, are added as a saturated solution in water which provides thereby sufficient water to form the mix and also sufficient magnesium chloride. These oxy-salt bonds yield high strength in the unfired state, and it is possible that the salt exerts a mineralizing action and aids in the formation of the mineral bond through re-crystallization of the magnesium oxide. The breakdown of the magnesium salt upon heating supplies additional MgO which materially aids in the formation of a strong mineral bond. Refractories prepared according to the invention and bonded with Sorel-type cements formed with periclase magnesia of the purity set forth above have shown very satisfactory stability in storage. They do not weaken or swell even upon treatment in an autoclave with steam at 20 pounds pressure for 2 hours. In fact, it is possible to secure a rapid maturing of the bond by this procedure. Although the high-purity finely divided periclase is still active enough to combine with the magnesium salts to form oxychloride or oxysulfate cements, it is evidently sufficiently inactive to avoid the usual destructive effects of hydration by water or steam.

Refractories bonded as described above can be installed and then fired in the place of use. However, it is possible to use other types of binders, such as, for example, organic binders which may be cereal products such as starch, dextrin or the like, or they may be lignin compounds, such as waste sulfite liquor. It is also possible to add as binder caustic or semi-caustic magnesia which sets with water alone; or magnesium hydroxide can be added as part of the binder. With these types of binders it is preferable to fire prior to installation.

As an example of the method of carrying out this invention, a refractory mix is prepared as follows:

| | Per cent by weight |
|---|---|
| Periclase, minus 6-mesh plus 14-mesh | 40 |
| Periclase, minus 20-mesh plus 40-mesh | 20 |
| Periclase, minus 200-mesh | 28 |
| Mg Cl$_2$.6H$_2$O, crystals | 2 |
| Slow setting magnesia, minus 200-mesh | 10 |

The magnesium chloride is dissolved in about 3% by weight of water, based on the total weight of dry ingredients. The periclase grain materials are mixed together and the admixture is then mixed with the magnesium chloride solution.

Then the minus 200-mesh magnesium oxide powder is blended in to coat the wetted grain material. When uniformly blended the batch is pressed at high pressure (in this example, about 7000 pounds per square inch), forming cylinders 2¼ inches in diameter by 3 inches in height. The shapes are allowed to cure, and are then placed under load for testing up to the temperature of failure. Several mixes are formed in this manner, in which the periclase grain materials vary in composition as shown in the table. The slow-setting magnesium oxide contains 97.0% MgO, 1.2% SiO₂.

The table below shows the results obtained upon firing under load, and it demonstrates clearly that as the MgO content rises from around 90% to around 95% the temperature of failure under 25 pounds per square inch loading falls rapidly from around 3000° F., to around 2300° F., or below, which is consistent with the experiences of prior investigators. But, as the purity of the grain increases above about 95% magnesium oxide, with simultaneous limitation of the silica to an upper limit of not exceeding 2%, the temperature of failure under the same conditions rises to 3200° F., or higher. In hot load tests, 14% deformation is considered equivalent to failure by shear.

fired under the test conditions described for the refractory compositions shown in the table, these objects did not fail when heated to 3200° F. The method of making the grain material of this example is described and claimed in my co-pending application, Serial Number 755,928, now Patent No. 2,487,290, in as much as it is a method of making grain which exhibits particular advantages. It is cited here merely to show another source of grain material useful in this invention.

In another variation of the process of making refractory articles or objects according to the process of the invention, a batch is made up using grain material having the following analysis, by weight: 97.0% MgO, 1.17% SiO₂, 0.50% Fe₂O₃, 0.12% Al₂O₃ and 1.18% CaO. In this example, the grain material is crushed and ground and proportioned so that 60% by weight is finer than 6-mesh and coarser than 40-mesh, and 40% by weight is finer than 200-mesh, a substantial proportion of the latter being finer than 325-mesh. The mixed grain material is moistened in a suitable mixer, such as a wet-pan, with approximately 5% by weight of a saturated solution of magnesium sulfate in water, based on the total weight of dry ingredients. The batch, after thorough blending, is formed into bricks under a pressure of about 7000 pounds per square inch, and the

*Table*

| Test No. | Composition Percent by Weight | | | | | Hot Load Results | Max. Temp. °F. |
|---|---|---|---|---|---|---|---|
| | MgO | SiO₂ | Fe₂O₃ | Al₂O₃ | CaO | | |
| 1 | 90.1 | 7.58 | 0.80 | 0.25 | 1.27 | 4.8% deformation | 2,975 |
| 2 | 95.1 | 2.94 | 0.49 | 0.14 | 1.18 | Failed by shear | 2,318 |
| 3 | 95.2 | 2.80 | 0.20 | 0.30 | 1.5 | do | 2,255 |
| 4 | 96.4 | 1.19 | 0.35 | 0.19 | 1.57 | 9.0% deformation | 3,380 |
| 5 | 99.6 | 0.07 | 0.26 | | 0.02 | 2.5% deformation | 3,506 |
| 6[1] | 96.5 | 1.43 | 0.42 | 0.45 | 1.05 | Failed by shear | 2,660 |
| 7[1] | 99.6 | 0.07 | 0.26 | | 0.02 | 4.0% deformation | 3,326 |

[1] Electrically fused periclase grain.

In a variation of the method there is employed a periclase grain material containing not exceeding about 1% of chromium expressed as Cr₂O₃. Such grain material is made by admixing a water solution of a chromium salt, such as sodium chromate, and washed magnesium hydroxide sludge recovered from seawater by treatment thereof with dry calcined dolomite, drying the mixture so obtained, forming into agglomerates, such as pellets, and calcining to about 3100° F. This material has a low porosity, amounting to less than 10% by volume, and shows by analysis 96.3% MgO, 1.35% SiO₂, 1.29% CaO, 0.31% Fe₂O₃, 0.19% Al₂O₃ and 0.49% Cr₂O₃. A batch of this grain material is crushed to pass a 4-mesh screen and 30% of the crushed material is pulverized in a ball mill to pass a 200-mesh screen. 2% by weight of magnesium chloride (MgCl₂.6H₂O), based on the total weight of dry ingredients, is dissolved in 3% by weight of water, based on the total weight of dry ingredients. The solution is mixed with the crushed and the pulverized material to wet the grains, and there is then added 10% by weight of the total weight of dry ingredients of hardburned magnesium oxide containing 97.0% MgO and 1.25% SiO₂, and having an ignition loss of about 0.3%. The blended mass is formed into the desired shapes, suitably under about 6000 pounds per square inch pressure, the shapes are then allowed to harden for approximately one week. Alternatively, they can be dried at an elevated temperature. When bricks are then allowed to harden for a week or more. Alternatively, for a more rapid cure, the pressed articles can be placed in an autoclave and hardened with steam pressure, for example, under 20 pounds steam pressure per square inch for a period of two hours. When fired under the same test conditions as described above, the bricks did not fail when heated to 3245° F.

Articles prepared by the methods of the examples which show the formation of a Sorel cement bond can be installed in furnaces and used as chemically bonded refractories with good results, as the shrinkage upon firing is very low, and in some cases, is as little as one-third of one percent upon firing to over 3600° F., in service.

If desired, however, articles made according to this invention can be fired in a kiln prior to use. Such firing can be carried out at a higher temperature, for instance 3000° F., or even higher, but it can also be effected at temperatures of as low as about 2200° F. to 2500° F., to obtain bricks, for instance, of excellent strength and improved resistance to thermal spalling. It is unexpected to be able to fire magnesia compositions of this purity and refractoriness at such low temperatures.

Batches prepared as described above can be employed as ramming mixes by proportioning the grain sizes, mixing and blending in the same manner as in preparing shaped articles. Instead of pressing into shapes however, the ramming mix batch is rammed or tamped into position in the usual manner known to the art. The dry materials can be blended and shipped or stored, preferably in moisture-proof containers, liquid being added at the time and place of use.

Figure 2:
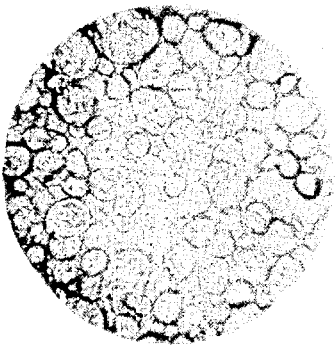

The mechanism of the improvement in magnesia refractories effected by the present invention is not completely understood. However, microscopic examination of thin sections of the refractories produced according to the invention has shown a marked difference between the crystallographic structure of the high purity periclase of this invention and the materials of the highest purity hitherto employed in the art. When the silica is limited in amount as herein described, crystallization of the non-fused periclase is more sharply defined. Figure 2 is a photomicrograph of a thin section, 230 diameters magnification, of a periclase refractory grain material of hitherto conventional composition, containing 95.2% MgO, 2.8% $SiO_2$, 1.5% CaO, 0.2% $Fe_2O_3$ and 0.3% $Al_2O_3$, and shows the crystals of MgO to be rounded or approximately spheroidal in form. In contrast to this, Figure 1 shows a photomicrograph of 230 diameter magnification of a thin section of a periclase refractory grain material made according to this invention and containing 97.0% MgO, 1.17% $SiO_2$, 0.50% $Fe_2O_3$, 0.12% $Al_2O_3$ and 1.18% CaO. This photomicrograph shows that these periclase crystals have substantially straight sides and angular corners. It is believed, therefore, that the straighter sides and sharper corners enable the crystals to constitute much better "building blocks" in that there is less slippage between the crystals under load when the matrix softens at elevated temperatures. In other words, with the more sharply defined crystals of the present invention, a greater amount of matrix, or lubricant, would be required for the same tendency to slip, at equal loads and temperatures, as exhibited by the more rounded crystals hitherto produced. Actually, as can be seen from the analyses hereinabove set forth, the amount of matrix present in the high-purity material is very noticeably less than in the earlier materials having the rounded crystals, and therefore tendency to slip, with resulting deformation or failure, under hot load, is decreased. It is also believed that the reduction in the amount of matrix present may permit the periclase crystals to approach each other so closely as to bring cohesive forces between the crystals into play and thereby strengthen the refractory grain. As evident from Figure 1, and further demonstrable by microscopic examination of the same or a similar field under crossed nicols, the magnesia crystals are so closely adjacent each other that the silicate matrix does not extend as a continuous film between all of the crystal surfaces but accumulates in segregated masses at intervals throughout the composition. Whatever the mechanism of the process involved, the periclase crystals in the refractories of this invention are bonded more strongly into refractory grains than has been effected with the materials hitherto employed in this art.

In addition, the resistance to spalling, which is notoriously poor in the previously known magnesia refractories, is very good in the products made according to this invention, and equals or excels that of the best chrome-magnesia refractories. As a demonstration of the improved spalling characteristics, periclase brick made according to this invention and designated "A," magnesia brick similarly prepared but having a periclase grain containing 7% of silica and designated "B" and a representative number of commercial magnesite bricks, the latter being designated "C," are tested according to a simple test devised to compare spalling in various samples.

In this method of testing, bricks measuring 9 x 4½ x 3 inches or 9 x 4½ x 2½ inches are laid as stretcher courses in a panel. The cold side and ends are insulated with firebrick and the face to be tested is exposed to heat, by placing it, cold, directly in front of an open testing furnace maintained at approximately 1400° C., for 20 minutes. The panel is then removed from the heat source and blasted with cold air for 10 minutes. These steps are repeated to make a total of 10 cycles. The spalling loss is determined as the percent by weight of the total brick, after cooling, which can be broken off by the fingers unaided by gloves, tapping, prying, etc. In the present tests the bricks are subjected to the spalling test without pre-firing, and the results show that the periclase brick made according to this invention is greatly superior to the others. The "A" brick exhibit a spalling loss of 1.1%; the "B" brick, 22.1%; and the "C" brick, 24.0% (an average of the commercial bricks, none of which show a loss of less than 18.2%).

As is apparent from the table, electrically fused periclase grain even of high-purity, produces refractory objects or articles which are inferior in hot load strength to those of comparable purity made according to this invention. It is believed that this difference between fused and non-fused grains may be a result of the activity exhibited by the non-fused material. That is to say, the non-fused periclase when finely divided, exhibits sufficient chemical reactivity, as described above, to form a Sorel cement with magnesium chloride or magnesium sulfate solutions. This property is not exhibited by magnesia which has been fused. It is believed that the higher activity of the non-fused, highly pure periclase of this invention allows it to recrystallize more readily to the ceramic bond between the grains of the refractory articles, whereas the fused periclase has come so completely to equilibrium that no further recrystallization is possible. It is probable that the fused grain is also relatively so inert that the bonding material is substantially unable to add on to it and tie the grains together. It is also believed that the increased roughness and porosity of the non-fused grain may provide better contact between grain and bonding material, thereby enabling production of refractory objects of the improved characteristics.

Furthermore, since the silicate impurities tend to concentrate upon the surface of the periclase crystals it seems probable that, with the more complete and larger crystallization of the periclase in the fused material and the consequent reduction in specific intercrystalline surface over that of the unfused material, an equivalent percentage of impurities would lead to thicker films of matrix in the fused material. These thicker films would have a greater lubricating effect and the result would be, as it is in practice, failure at lower temperatures than in the case of non-fused crystals. As shown in the table, a refractory made of fused grain material containing 99.6% magnesia exhibited 60% greater deformation under load at a temperature of 3326° F. (Test No. 7) than was shown by the non-fused material of the same chemical composition at a temperature almost 200° F. higher (Test No. 5).

Figure 3:
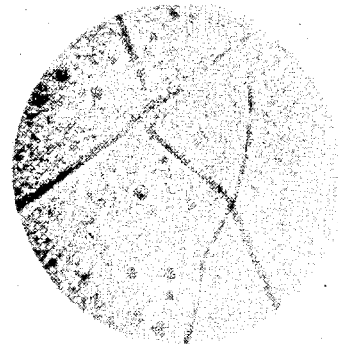

Figure 3 is a photomicrograph, of 230 diameter magnification, of electrically fused periclase refractory grain material containing 96.7% MgO and 1.43% SiO₂, and, when compared with Figure 1, demonstrates the differences in crystal size and intercrystalline surface relationships as explained above.

Whatever may be the explanation for the improved results this process opens up new fields for high-magnesia refractories. The refractory compositions of this invention have several advantageous characteristics. Besides being extremely refractory, due to the high MgO content, they exhibit very high strengths under load at high temperatures, great resistance to spalling, and great resistance to chemical attack. These refractories can be employed economically in furnaces operating at temperatures 300° F., or more, higher than has formerly been feasible with magnesia refractories. While silicia must not exceed 2% in the bond and the finer constituents of the refractory mix, somewhat larger proportions can be tolerated in the coarser constituents. Preferably, however, the silicia content does not exceed 2% in any of the constituents.

In the specification and claims all percentages shown are percentages by weight. In conformity with common practice in reporting chemical analyses of refractory materials, in the specification and claims the proportions of the various chemical constituents present in a material are given as though these constituents were present as the simple oxides. Thus, the magnesium constituent is referred to as magnesium oxide or MgO, the chromium constituent as Cr₂O₃, and the silicon constituent as silica or silicon dioxide, although the silica and a very small proportion of the magnesium oxide may be present in combination with each other or with the other minor constituents. For example, the term "2.0% by weight of silicon expressed as silicon dioxide" is intended to mean that a chemical analysis of the material referred to would show the silicon content as 2.0% SiO₂, although in actuality all of the silicon might be present in the form of silicates of magnesium, lime, aluminum and iron.

What is claimed is:

1. A non-fused refractory composition comprising as aggregate non-fused periclase grain material containing at least 95% by weight of magnesium oxide, and a minor proportion of a bonding agent which upon firing provides an overall refractory composition analyzing at least 95% by weight of magnesium oxide and not more than 2% by weight of silicon dioxide.

2. A non-fused refractory composition comprising as aggregate non-fused periclase grain material containing at least 95% by weight of magnesium oxide and a minor proportion of a bonding agent which upon firing yields a refractory composition containing at least 95% by weight of magnesium oxide, the finer constituents of said composition in the unfired state containing not over 2% by weight of silica.

3. A non-fused fired refractory material comprising a minor proportion of a bonding agent and as aggregate non-fused periclase grain, and containing at least 95% by weight of magnesium oxide and not more than 2% by weight of silica.

4. A composition suitable for firing to a refractory product which comprises as aggregate non-fused periclase grain material containing at least 95% by weight of magnesium oxide, the finer constituents of said grain material containing not over 2.0% by weight of silica, and as bonding material a minor proportion of Sorel cement adapted to yield upon firing at least 95% by weight of magnesium oxide and not more than 2% by weight of silica.

5. A composition suitable for firing to a refractory product which comprises as aggregate non-fused periclase grain containing at least 95% by weight of magnesium oxide and not more than 2% by weight of silica, and as bonding material a minor proportion of Sorel cement adapted to yield upon firing at least 95% by weight of magnesium oxide and not more than 2% by weight of silica.

6. Composition as in Claim 5 wherein the Sorel cement is magnesium oxychloride.

7. Composition as in claim 5 wherein the Sorel cement is magnesium oxysulfate.

8. A non-fused refractory composition comprising at least 95.0% by weight of magnesium oxide and not over 2% by weight of silica, containing a minor proportion of a bonding material and as aggregate non-fused periclase grain material containing from 96% to 99.6% magnesium oxide and not exceeding about 1.2% silica.

9. A non-fused refractory composition comprising at least 95.0% by weight of magnesium oxide and not over 2% by weight of silica, containing a minor proportion of a bonding material and as aggregate non-fused periclase grain material containing at least 95.0% magnesium oxide, not exceeding 2.0% silica and not exceeding 1.0% of Cr₂O₃.

10. A process of preparing a periclase refractory which comprises adding in a batch non-fused periclase grain material containing at least 95% by weight of magnesium oxide and water, and adding as dry bonding agent finely divided magnesia showing upon analysis at least 95% by weight of magnesium oxide and not over 2% by weight of silica.

11. A process of preparing a periclase refractory which comprises admixing non-fused periclase grain material containing at least 95% by weight of magnesium oxide and not over 2% by weight of silica, and a minor proportion of a bonding material consisting of finely divided magnesia, showing upon analysis at least 95% by weight of magnesium oxide and not over 2% by weight of silica, and a water solution of at least one material chosen from the group consisting of magnesium chloride and magnesium sulfate.

12. A process of preparing a periclase refractory which comprises adding in a batch non-fused periclase grain material containing at least 95% by weight of magnesium oxide and not over 2% by weight of silica, and adding a minor proportion of a bonding material consisting of finely divided non-fused periclase passing through a 200 mesh screen and showing upon analysis at least 95% by weight of magnesium oxide and not over 2% by weight of silica, and a water solution of at least one material chosen from the group consisting of magnesium chloride and magnesium sulfate.

13. Process of making a periclase refractory article which comprises admixing non-fused periclase grain material containing at least 95% by weight of magnesium oxide and not over 2% by weight of silica and as bonding agent a minor proportion of finely divided magnesia passing through a 200 mesh screen and a substantial proportion passing through a 325 mesh screen and showing upon analysis at least 95% by weight of magnesium oxide and not over 2% by weight of silica, and water, forming the mixture into shape, and firing to obtain a non-fused periclase refractory article containing at least 95% by weight magnesium oxide and not more than 2% by weight silica.

14. Process of making a periclase refractory article of improved spalling resistance which comprises admixing non-fused periclase grain material containing at least 95% by weight of magnesium oxide and not over 2% by weight of silica, and as bonding agent a minor proportion of finely divided magnesia passing through a 200 mesh screen and a substantial proportion passing through a 325 mesh screen showing upon analysis at least 95% by weight of magnesium oxide and not over 2% by weight of silica, and water, forming the mixture into shape, and firing at a temperature of from about 2200° F. to about 2500° F. to obtain a periclase refractory article containing at least 95% by weight magnesium oxide and not over 2% by weight silica.

15. A non-fused refractory composition which comprises as aggregate non-fused periclase grain material containing at least 95% by weight of magnesium oxide and a minor proportion of a bonding agent containing magnesia passing a 200 mesh screen and a substantial proportion passing a 325 mesh screen, said refractory composition containing upon firing at least 95% by weight of magnesium oxide and not over 2% by weight of silica.

LESLIE W. AUSTIN.

REFERENCES CITED

The following references are of record in the file of this patent:

UNITED STATES PATENTS

| Number | Name | Date |
|---|---|---|
| 1,451,540 | France | Apr. 10, 1923 |
| 1,616,192 | Marks | Feb. 1, 1927 |
| 1,686,876 | O'Harra et al. | Oct. 9, 1928 |

FOREIGN PATENTS

| Number | Country | Date |
|---|---|---|
| 24,108 | Germany | 1883 |
| 9,917 | Great Britain | 1884 |
| 25,429 | Great Britain | 1902 |
| 13,697 | Great Britain | 1909 |
| 142,721 | Great Britain | 1920 |
| 292,958 | Great Britain | 1928 |
| 794,346 | France | 1935 |

OTHER REFERENCES

Searle: Refractory Materials (1924) pages 182, 188, 383, 384.

Hackh's Chem. Dictionary 3rd. Ed. (1944) page 790.